UNITED STATES PATENT OFFICE.

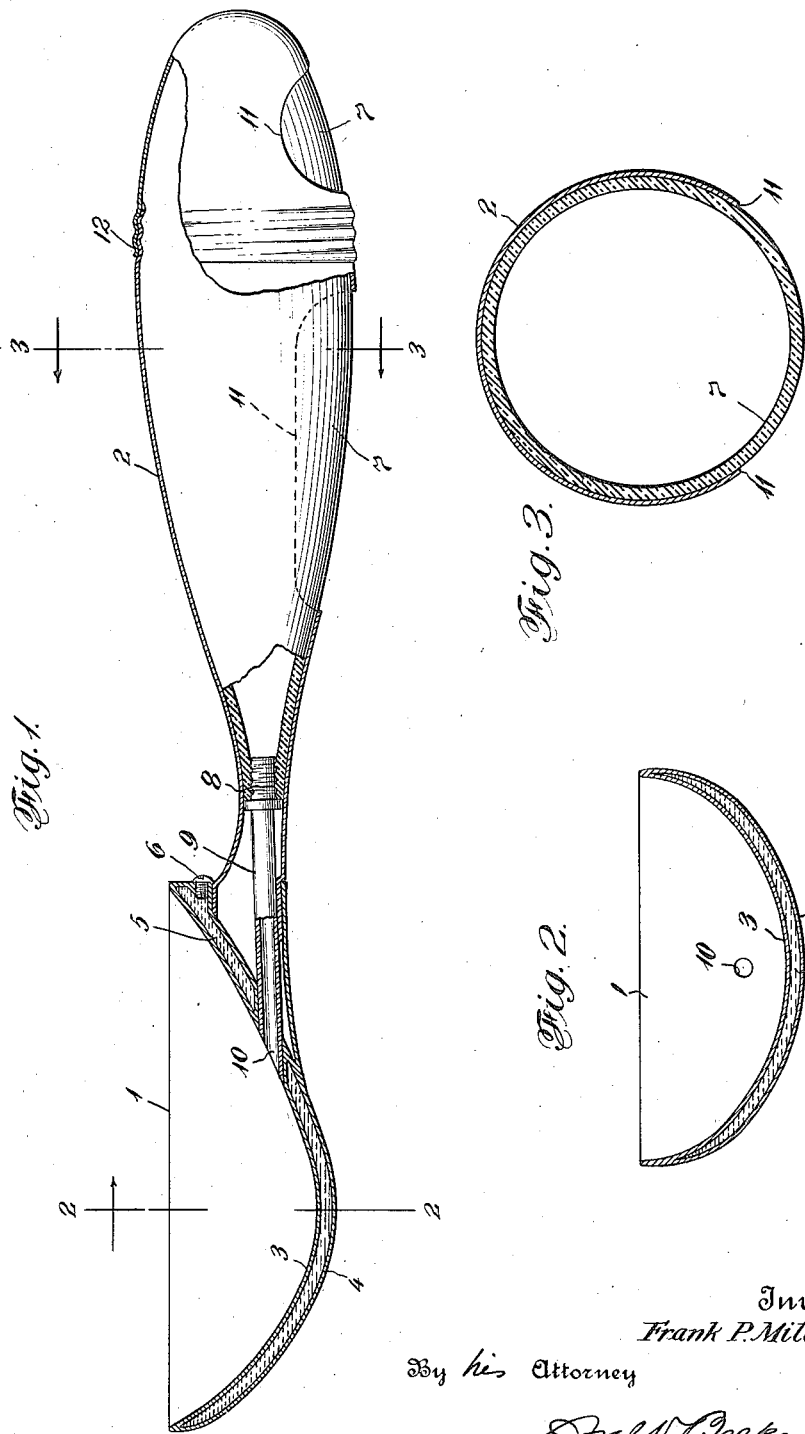

FRANK P. MILLER, JR., OF HOBOKEN, NEW JERSEY.

ICE-CREAM-SERVING DEVICE.

1,255,906.  Specification of Letters Patent.  Patented Feb. 12, 1918.

Application filed March 23, 1917. Serial No. 156,814.

*To all whom it may concern:*

Be it known that I, FRANK P. MILLER, Jr., a citizen of the United States, and a resident of Hoboken, in the county of Hudson and State of New Jersey, have invented certain new and useful Improvements in Ice-Cream-Serving Devices, of which the following is a specification.

The invention relates generally to an ice cream serving device, has for its object the ready discharge of the contents of the device, and consists of the hereinafter described features of construction.

Other features of the invention will be referred to as the specification proceeds.

In the accompanying drawing, wherein there is shown one of the many possible embodiments of the invention, Figure 1 is a side view, partly in section and partly in elevation, of a device embodying the invention.

Fig. 2 is a vertical sectional view of the device taken along the line 2—2 of Fig. 1.

Fig. 3 is a section taken along the line 3—3 of Fig. 1.

In the particular embodiment of the invention chosen for illustration an ice-cream serving device is shown in Fig. 1 as having a general spoon-shaped formation with a bowl, or container portion, 1 and a handle 2.

Serving devices of this general nature are commonly employed for transferring ice-cream or other frozen eatables from a storage receptacle to the individual dishes in which it is served.

Because of the tendency of the frozen mass to freeze to the bowl of the serving device, much annoyance has been experienced, particularly where it has been necessary to rapidly fill a great number of individual dishes.

To overcome the freezing and consequent adherence of the congealed mixture to the bowl of the serving device, the bowl 1 of the serving device embodying the present invention is made up of double walls, an inner wall 3 and an outer wall 4 having between them a chamber 5 with a filling orifice adapted to be closed by a screw cap 6. By filling the chamber 5 with liquid, or other material that has a relatively lower heat conducting capacity than that of the metallic wall 3 forming the concave surface of the bowl, the temperature of the wall 3 is maintained at a higher temperature than that of the contents of the bowl, so that the adherence that would otherwise take place between the congealed contents and the bowl is wholly eliminated. The explanation for this effect is, of course, obvious. The non-heat-conducting filling material in the chamber 5 prevents the escape of heat from the wall 3 and thereby causes the temperature of the wall to be maintained at a higher point than that necessary for freezing and the consequent adherence to take place. By means of the simple structure just described the annoyance that attends the use of the ordinary serving device, formed of a single, thin wall of metal exposed directly to heat-conducting air currents, with the consequent freezing of the contents to the bowl, is wholly eliminated.

Not only is the serving device illustrated adapted to prevent adherence between the bowl and its contents, but means are also included in the device for assisting in the discharge of the contents therefrom.

Discharging mechanism has been embodied in serving devices in the prior art, but such devices have included mechanically operated members for either pushing or scooping the contents from the bowl of the serving device. It will be seen that the use of such devices prevented the discharge of the material in such form as to retain the contour and the smooth surface produced by contact with the walls of the container, so that the appearance of the discharged substance was rendered generally unsightly and unattractive by the discharging operation.

It has been found that the device can be readily discharged by forcing air between the bowl and its contents and without in any way marring or disfiguring the surface of the congealed mass. The action of air thus applied apparently has a double effect, in that the tendency of atmosphere pressure to hold the contents in the bowl is overcome, leaving the contents free to be expelled, and also in that the pressure of the air applied between the bowl and its contents assists in the actual discharge of the material.

In the practice of the invention, a bulb 7, of rubber or the like, is mounted in the hollow handle 2 and connected at 8 to a tube 9 leading from the handle 2 to the bowl 1 and having an outlet at 10 in the inner wall 3 of the bowl.

The handle 2 guards the bulb mounted within it against accidental deflation but is provided with openings 11 that admit of ready access to the bulb so that it may be compressed by the fingers of the operator to force air through the tube 9 and orifice 10 to the interior of the bowl 1 to assist in discharging the contents therefrom.

It will be seen that the handle 2, which is preferably made in sections that can be screwed together at 12, can be grasped without compressing the bulb in order to fill the bowl 1 from the storage receptacle, and that the bowl 1 can be readily caused to discharge its contents by inverting it and compressing the bulb 7, thereby forcing air between the inner surface of the bowl and the contents thereof.

It will be obvious that, while a container of a particular type has been shown, other forms can equally well be supplied with the means for preventing adherence between the container and its contents, or with pneumatic means for discharging the contents from the container. For instance, ice-cream molds can be equipped with the means for discharging their contents through air pressure, thus doing away with the necessity for placing the molds in hot water, after taking them from the freezing solution, in order to detach the mold surfaces from the contents. It is also pointed out that the discharging means need not necessarily be used in handling congealed substances but it is also useful in connection with the manipulation of any substance having a tendency to adhere to a container, regardless of the temperature of the mass.

The particular device shown and described provides, however, an especially useful embodiment of the invention.

By its use the serving of ice-cream, ices, sherbets and the like, can be greatly expedited and consequently the objectionable delays resulting in the partial melting of the material, which characterizes the use of prior devices, can be largely eliminated. Should it be found desirable, the bulb 7 in the handle of the device can be employed to discharge flavoring syrups, instead of air, and thus not only operate to discharge the ice-cream, but to pour over it a flavoring syrup as well.

What is claimed is:

An ice cream serving device including a bowl having double walls, relatively non-heat conducting material between the walls, a handle portion connected to said bowl and consisting in part of a compressible bulb having a guard to prevent accidental deflation thereof and a pipe extending from said bulb through the double walls to the interior of the bowl.

Signed at New York city, in the county of New York and State of New York, this 22nd day of March, A. D. 1917.

FRANK P. MILLER, Jr.